(12) United States Patent
Aono et al.

(10) Patent No.: US 8,494,310 B2
(45) Date of Patent: Jul. 23, 2013

(54) THREE-DIMENSIONAL MODEL SEARCH METHOD, COMPUTER PROGRAM, AND THREE-DIMENSIONAL MODEL SEARCH SYSTEM

(75) Inventors: Masaki Aono, Toyohashi (JP); Yohei Seki, Toyohashi (JP); Atsushi Tatsuma, Toyoshashi (JP)

(73) Assignee: National University Corporation Toyohashi University of Technology, Toyohashi-shi, Aichi (JP)

( * ) Notice: Subject to any disclaimer, the term of this patent is extended or adjusted under 35 U.S.C. 154(b) by 901 days.

(21) Appl. No.: 12/514,144

(22) PCT Filed: Nov. 9, 2007

(86) PCT No.: PCT/JP2007/071765
§ 371 (c)(1),
(2), (4) Date: May 8, 2009

(87) PCT Pub. No.: WO2008/056757
PCT Pub. Date: May 15, 2008

(65) Prior Publication Data
US 2010/0054607 A1    Mar. 4, 2010

(30) Foreign Application Priority Data

Nov. 10, 2006    (JP) .................................. 2006-305546

(51) Int. Cl.
*G06K 9/60* (2006.01)
*G06K 9/00* (2006.01)
*G06K 9/36* (2006.01)

(52) U.S. Cl.
USPC .......................... 382/305; 382/154; 382/288

(58) Field of Classification Search
None
See application file for complete search history.

(56) References Cited

U.S. PATENT DOCUMENTS

| 2004/0013305 A1* | 1/2004 | Brandt et al. ................. 382/224 |
| 2004/0103093 A1* | 5/2004 | Furuhashi et al. ................ 707/3 |
| 2007/0237355 A1* | 10/2007 | Song et al. .................... 382/100 |

OTHER PUBLICATIONS

Vranić, 3D Model Retrieval, 2004, Universitat Leipzig, Ph. D Dissertation, pp. 1-226.*
Osada et al., Shape Distributions, ACM, TOG, 21 (4), pp. 807-832, 2002.
Kazhdan et al., Rotation Invariant Spherical Harmonic Representation of 3D Shape Descriptors, Proc. Eurographics, ACM Siggraph Symp. on Geometry Processing, pp. 156-164, 2003.
Chen et al., On Visual Similarity Based 3D Model Retrieval, Computer Graphics Forum, 22(3), pp. 223-232, 2003.
Vranic, 3D Model Retrieval, Ph.D. Dissertation, University of Leipzig, 2004.

\* cited by examiner

*Primary Examiner* — Bhavesh Mehta
*Assistant Examiner* — David F Dunphy
(74) *Attorney, Agent, or Firm* — Quarles & Brady LLP; Gavin J. Milczarek-Desai

(57) ABSTRACT

A novel search method having an advantage over the DSR 472 method the search accuracy of which is currently said to be the highest level is proposed. At the feature value computation stage, the two-dimensional image used in computation of the three-dimensional model feature value (excluding a contour feature value) is corrected so that the gray scales of the pixels are emphasized more as the distance from the center of the two-dimensional image increases.

8 Claims, 11 Drawing Sheets

PERIPHERY ENHANCED IMAGES COMPENSATED WITH THE DISTANCE FROM THE CENTER

EXAMPLE OF DIFFERENT MIRROR IMAGES AND DIFFERENT SHAPES IN FRONT AND BACK

NORMAL VECTOR IS OBTAINED BY A POINT AND TWO VERTICES OF A TRIANGLE

EXAMPLE OF DEPTH BUFFER IMAGES
VIEWED AND SHADED FROM 6 ORTHOGONAL DIRECTIONS

PERIPHERY ENHANCED IMAGES COMPENSATED WITH THE DISTANCE FROM THE CENTER

IMAGES TRANSFORMED TO POLAR COORDINATES

EXAMPLE OF SILHOUETTE IMAGES

EXAMPLES OF CONTOUR IMAGES

EXAMPLE OF A VOXEL

COMPARISON OF SEARCH PERFORMANCE BY RECALL-PRECISION PLOT

*Fig.12*

CONSIDER PARTITIONING A DATA SET S = {$s_1, ..., s_n$} APPLIED BY $\mathbb{R}^t$ INTO k CLUSTERS (1) COMPUTE AN AFFINITY MATRIX A $\in \mathbb{R}^{n \times n}$, WHERE $A_{ij} = \exp(-\|s_i - s_j\|^2/2\sigma^2)$, $A_{ii} = 0$.

(2) OBTAIN A DIAGONAL MATRIX D HAVING THE SUM OF THE $i^{TH}$ ROW OF THE AFFINITY MATRIX A AS ELEMENTS, AND $L = D^{-1/2}AD^{-1/2}$.

(3) OBTAIN k LARGEST EIGENVECTORS, $x_1, x_2, ..., x_k$, OF THE MATRIX L AND PRODUCE A MATRIX $X = [x_1, x_2, ..., x_k] \in \mathbb{R}^{n \times k}$ HAVING EIGENVECTORS AS COLUMNS.

(4) OBTAIN A MATRIX Y BY NORMALIZING $Y_{ij} = X_{ij}/(\sum_j X_{ij}^2)^{1/2}$ AND THE MATRIX X.

(5) TREAT EACH ROW OF THE MATRIX Y AS A POINT OF $\mathbb{R}^k$, AND PRODUCE k CLUSTERS BY A K-MEANS METHOD OR THE LIKE.

(6) AN ORIGINAL DATA ITEM $s_i$ IS ASSIGNED TO A CLUSTER j ONLY WHEN THE $i^{TH}$ ROW OF THE MATRIX Y IS ASSIGNED TO THE CLUSTER j,

WHERE $\sigma^2$ IS A SCALING PARAMETER FOR CONTROLLING THE DECREASING SPEED OF THE ELEMENTS OF THE AFFINITY MATRIX A.

Fig. 13

CONSIDER PARTITIONING A DATA SET $S = \{s_1, \ldots, s_n\}$ APPLIED BY $\mathbb{R}^l$ INTO k CLUSTERS (1) REGARD EACH DATA ITEM $s_1, \ldots, s_n$ AS A VERTEX AND ASSUME THAT m NEIGHBORS ARE CONNECTED BY A MANHATTAN DISTANCE.

(2) OBTAIN THE SMALLEST GEODESIC DISTANCE $d_{ij}$ BETWEEN $s_i$ AND $s_j$ BY A DIJKSTRA METHOD.

(3) COMPUTE AN AFFINITY MATRIX $A \in \mathbb{R}^{n \times n}$, WHERE $A_{ij} = \exp(-d_{ij}^2 / 2\sigma^2)$, $A_{ii} = 0$.

(4) OBTAIN A LAPLACIAN MATRIX $L = I - A$ (5) OBTAIN k LARGEST EIGENVECTORS, $x_1, x_2, \ldots, x_k$, OF THE LAPLACIAN MATRIX L AND PRODUCE A MATRIX $X = [x_1, x_2, \ldots, x_k] \in \mathbb{R}^{n \times k}$ HAVING EIGENVECTORS AS COLUMNS.

(6) TREAT EACH ROW OF THE MATRIX X AS A POINT OF $\mathbb{R}^k$, AND PRODUCE k CLUSTERS BY A K-MEANS METHOD OR THE LIKE.

(7) AN ORIGINAL DATA ITEM $s_i$ IS ASSIGNED TO A CLUSTER j ONLY WHEN THE $i^{TH}$ ROW OF THE MATRIX X IS ASSIGNED TO THE CLUSTER j.

Fig. 14

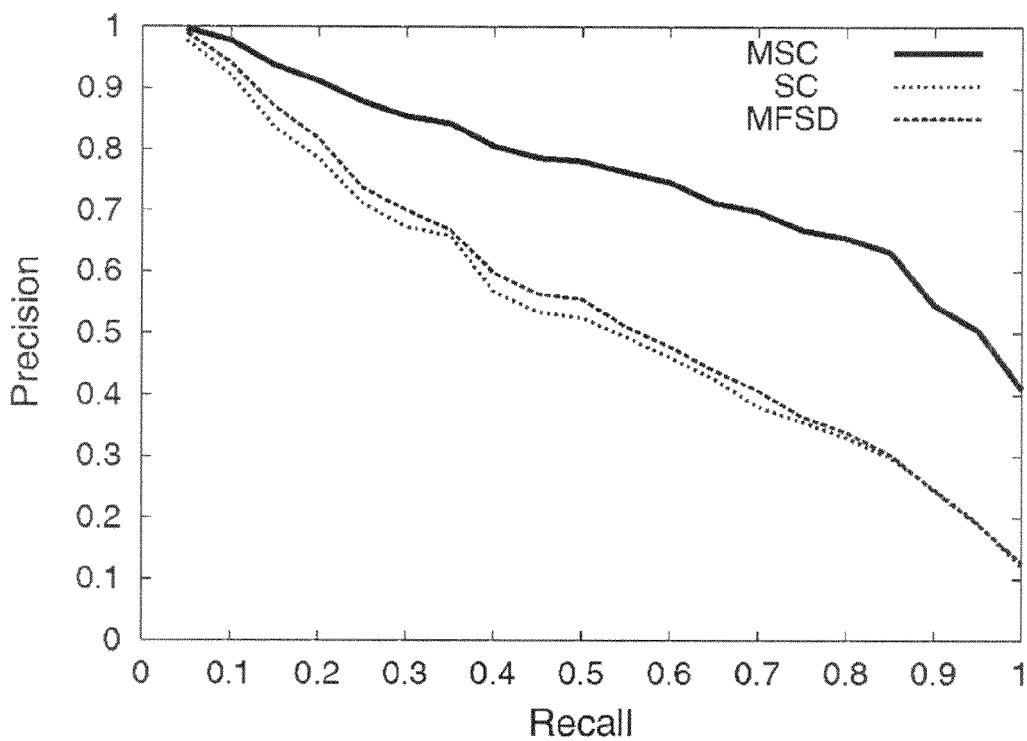

THREE-DIMENSIONAL MODEL SEARCH METHOD, COMPUTER PROGRAM, AND THREE-DIMENSIONAL MODEL SEARCH SYSTEM

TECHNICAL FIELD

The present invention relates to a three-dimensional model search method, a computer program, and a three-dimensional model search system.

BACKGROUND ART

Various methods have been known as three-dimensional model search methods.

D2: D2 is a feature vector having the highest search accuracy in the study conducted by Osada et al. (Non-Patent Document 1). Random point groups are generated on planes of a three-dimensional model, and a histogram showing the frequency of the Euclidean distance between arbitrary two points out of randomly generated points is used as the feature vector. The distance between the feature vectors is a Manhattan distance calculated by using the histogram as a one-dimensional vector.

Spherical Harmonics Descriptor (SHD): SHD is a method proposed by Kazhdan et al. (Non-Patent Document 2). A spherical harmonics transform is performed on a voxeled three-dimensional model, and a low-frequency part of the resultant power spectrum is used as a feature vector. The distance between the feature vectors is a Euclidean distance calculated by using the obtained power spectrum as a one-dimensional vector.

Light Field Descriptor (LFD): LFD is a method proposed by Chen et al. (see Non-Patent Document 3). The vertices of a regular dodecahedron are used as viewpoints, and silhouette images of the three-dimensional model are produced from a multiplicity of viewpoints by rotating the regular dodecahedron. A Zernike moment and a Fourier spectrum of the generated silhouette images are calculated as a feature vector. The distance between feature vectors is the smallest L1 distance in combination of each vertex of the dodecahedron.

Hybrid Descriptor (DSR 472): DSR 472 is a feature vector having the highest search accuracy in the study conducted by Vranic (see Non-Patent Document 4). This feature vector was invented by Vranic, which is a combination of a Depth Buffer feature vector, a silhouette feature vector, and a Ray feature vector that is obtained by orienting a vector from the center of gravity into any direction. The distance between feature values is a Manhattan distance calculated by using the composite feature value as a one-dimensional vector.

[Non-Patent Document 1] R. Osada, T. Funkhouser, B. Chazelle, D. Dobkin, Shape Distributions, ACM, TOG, 21 (4), pp. 807-832, 2002.

[Non-Patent Document 2] M. Kazhdan, T. Funkhouser, S. Rusinkiewicz, Rotation Invariant Spherical Harmonic Representation of 3D shape Descriptors, Proc. Eurographics, ACM SIGGRAPH Symp. On Geometry Processing, pp. 156-164, 2003.

[Non-Patent Document 3] D.-Y. Chen, X.-P. Tian, Y.-T. Shen, M. Ouhyoung, On Visual Similarity Based 3D Model Retrieval, Computer Graphics Forum, 22 (3), pp. 223-232, 2003.

[Non-Patent Document 4] D. Vranic, 3D Model Retrieval, Ph. D. thesis, University of Leipzig, 2004.

DISCLOSURE OF THE INVENTION

Problems to be Solved by the Invention

The inventors had studied hard to obtain a novel search method having an advantage over the DSR 472 method that is currently said to have the highest search accuracy. As a result, the search accuracy higher than that of the DSR 472 method was able to be obtained at the embodiment level. The inventors completed the present invention by finding the following fact: in order to obtain such high search accuracy, a two-dimensional projected image for use in computation of a feature vector (excluding a contour feature vector) from a three-dimensional model needs to be corrected at the feature vector computation stage so that the gray scales of pixels are emphasized more as the distance from the center of projected the two-dimensional image increases.

More specifically, the present invention is a three-dimensional model search method for searching a known three-dimensional model similar to a three-dimensional model as a query target which has been subjected to pose normalization, comprising the steps of: correcting a projected two-dimensional image for use in computation of a feature vector (excluding a contour feature vector) from the three-dimensional model so that gray scales of pixels are emphasized as a distance from a center of the two-dimensional image increases; performing a Fourier transform of the intensity-modified two-dimensional image; computing a feature value from the result of the Fourier transform; and comparing the obtained feature vector with the feature vectors of the known three-dimensional model.

BRIEF DESCRIPTION OF THE DRAWINGS

FIG. 12 is a diagram illustrating a common spectral clustering method.

FIG. 13 is a diagram illustrating a spectral clustering method of the embodiment.

FIG. 14 is a graph showing search accuracy obtained by spectral clustering.

DESCRIPTION OF THE REFERENCE NUMERALS

Figure 1:
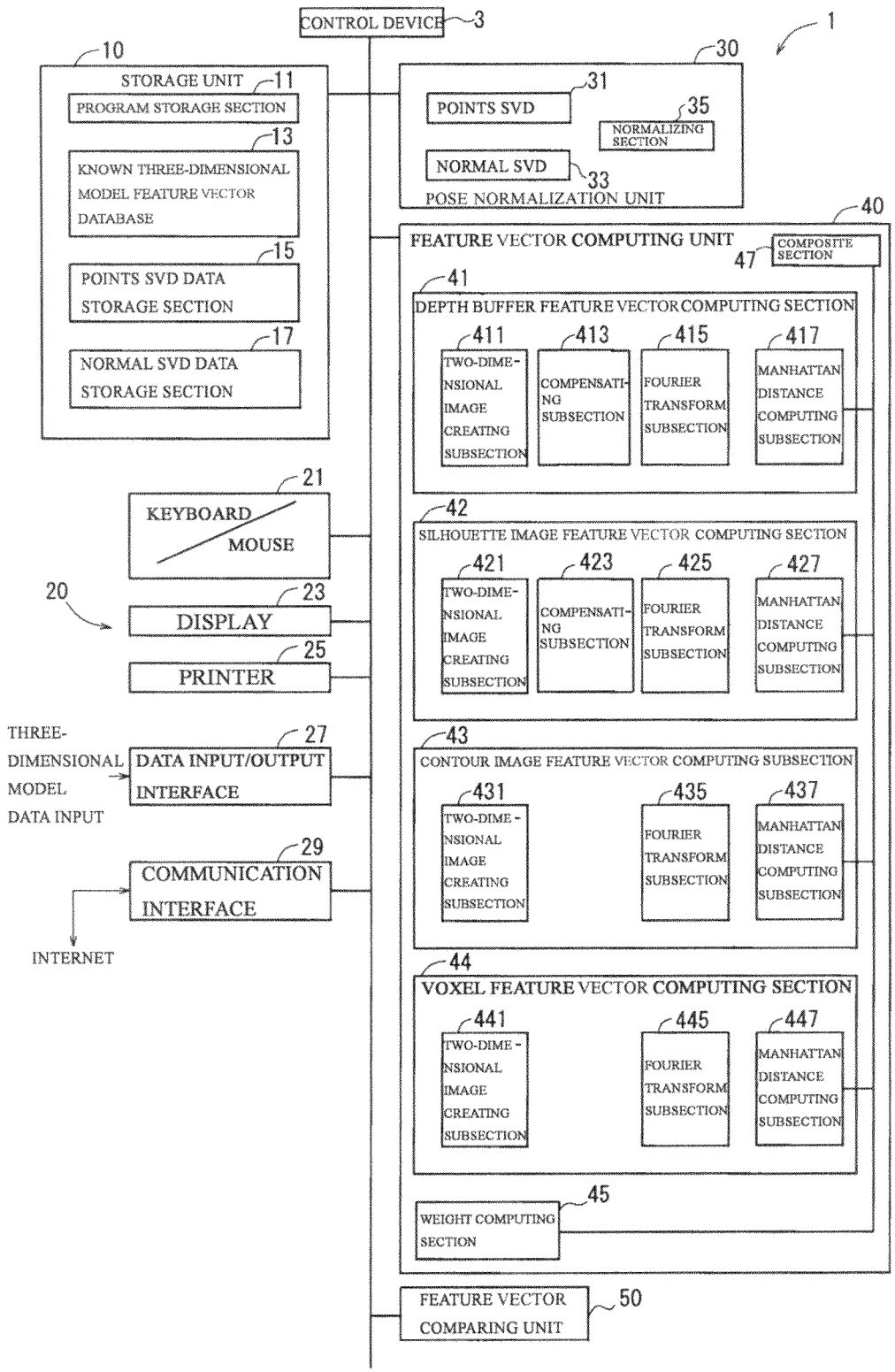
FIG. 1 is a block diagram showing a search system of an embodiment of the present invention.

1: three-dimensional model search system; 10: storage unit; 20: input/output device; 30: pose normalization unit; 40: feature value computing unit; and 50: feature vector comparison unit.

According to the first aspect of the invention thus defined, a two-dimensional image for use in computation of a feature vector (excluding a contour feature vector) of a three-dimensional model is compensated so that gray scales of pixels are emphasized as a distance from a center of the two-dimensional image increases. A contour feature of the three-dimensional model is therefore emphasized in the compensated two-dimensional image. As a result, the accuracy of the similarity search is improved.

The three-dimensional search method includes: a pose normalization step of performing pose normalization of the three-dimensional model; a feature-vector-computation step of computing a feature vector of the three-dimensional model subjected to the pose normalization; and a comparing step of comparing the computed feature vector with a feature vector of the known three-dimensional model.

Note that the feature vector of the known three-dimensional model is also obtained by the same pose normalization step and the same feature-vector-computation step as those performed on the three-dimensional model as a query target.

In the first aspect of the present invention, a known two-dimensional image for use in computation of a feature vector of the three-dimensional model is compensated in the above feature-vector-computation step.

Examples of the two-dimensional image for use in computation of the feature vector of the three-dimensional model include a Depth Buffer image or a silhouette image.

A Depth Buffer image is a two-dimensional gray-scale image obtained by shading from a light source to a three-dimensional model in parallel from a viewpoint direction, and represents the distance (depth) to the surface of the three-dimensional model by varying gray scales.

A silhouette image is a two-dimensional binary image representing the shadow formed by applying light to a three-dimensional model.

Although any method can be used as the method for modifying a two-dimensional image so that gray scales of pixels are emphasized as a distance from a center of the two-dimensional image increases, the following method is used according to a second aspect of the present invention. Provided that r is a distance from the center of the two-dimensional image, an intensity I'(x, y) of each two dimensional coordinate in the compensated two-dimensional image is represented by the following expression:

$$r = ((Kx-x)^2 + (Ky-y)^2)^{1/2}$$

$$I'(x,y) = r * I(x,y)^2$$

where, (Kx, Ky) represents the centroid of the two-dimensional image before intensity enhancement in an x- and y-axis direction, respectively, and I(x, y) denotes an intensity of each coordinate in the two-dimensional image before intensity enhancement.

By performing such intensity enhancement, the gray scales of the pixels are getting brighter as the distance from the center of the two-dimensional image increases, while the pixel values are getting darker toward the center of the two-dimensional image.

The compensated two-dimensional image is then transformed from rectangular coordinates to polar coordinates and a two-dimensional Fourier transform is applied to obtain a power spectrum. Only low-frequency components are extracted from the power spectrum. This is because it is considered that high-frequency components representing a tiny shape difference can be ignored as noise in the case of similarity search.

The low-frequency components extracted from the power spectrum are further divided into M number of low-frequency components. This way, a vector including absolute values of the M low-frequency components is generated and this vector is defined in this invention as a feature vector.

In the case where the search is performed by using multiple feature vectors, each feature vector is normalized and then weighted, and the resultant feature vectors are composited. Any weighting method can be herein selected. In an embodiment described below, a Purity method is used as a weighting method because there is a benchmark database grouped into predefined classes.

The position, size, and orientation of three-dimensional models are arbitrary depending on the decision of a producer. Even with similar shapes, the contents of three-dimensional models tend to be significantly dissimilar if the position, size, and orientation are slightly different. It is desirable in feature-vector computation that similar feature vectors are obtained from three-dimensional models having similar shapes. A three-dimensional model is therefore subjected to pose normalization before the feature vector is computed.

According to another aspect of the present invention, the present invention proposes to compute a feature vector of a three-dimensional model subjected to a plurality of pose normalization processes.

As a novel pose normalization method, the present invention proposes two pose normalization methods. The first pose normalization method is a method in which and random points are generated on triangular surfaces forming a three-dimensional model principal component analysis with the random points are performed, thereby a principal axis is obtained, and normalization process is completed. The second pose normalization method is a method in which a principal axis is obtained by distributing normal vectors with each random point generated on a plane of a three-dimensional model and with two vertices of a triangle close to the random point, and normalization process is completed.

EMBODIMENTS

Hereinafter, an embodiment of the present invention will be described.

FIG. 1 is a block diagram showing the structure of a search system 1 of the embodiment.

The search system 1 of the embodiment is formed by a general-purpose computer device, and its functions are shown in a block diagram of FIG. 1. More specifically, the search system 1 of the embodiment is formed by a control device 3, a storage unit 10, an input/output unit 20, a pose normalization unit 30, a feature vector computing unit 40, and a feature vector comparing unit 50.

The control device 3 reads a control program from a program storage section 11 of the storage unit 10 and controls each element according to the program.

Three-dimensional models together with their feature vectors computed by the method described below are stored in a known three-dimensional model feature vector database 13 of the storage unit 10. The three-dimensional models have been subjected to pose normalization and they are thus normalized.

A Points SVD data storage section 15 temporarily stores data of a three-dimensional model as a search query which has been subjected to Points SVD and normalization. A Normal SVD data storage section 17 temporarily stores data of a three-dimensional model as a search query which has been subjected to Normal SVD and normalization.

The input/output unit 20 includes a keyboard/mouse 21, a display 23, a printer 25, and a data input/output interface 27, and a communication interface 29. A three-dimensional model as a search query can be fed to the system through the data input/output interface 27.

The communication interface 29 connects the system to the Internet.

The pose normalization unit 30 performs pose normalization on a three-dimensional model as a search query, and then performs normalization for shape matching.

The pose normalization unit 30 has a Points SVD section 31 and a Normal SVD section 33. The Points SVD section 31 and the Normal SVD section 33 perform pose normalization by different methods from each other. A normalizing section 35 solves arbitrariness of the shape of three-dimensional models.

Data of a three-dimensional model subjected to pose normalization in the Points SVD section 31 and normalization in the normalizing section 35 is stored in the Points SVD data storage section 15 of the storage unit 10. Data of a three-dimensional model subjected to pose normalization in the Normal SVD section 33 and normalization in the normalizing section 35 is stored in the Normal SVD data storage section 17.

Hereinafter, Points SVD will be described in detail.

In the Points SVD, random points are generated on triangles forming a three-dimensional model. This process is performed by using a method of Osada et al. (R. Osada, T. Funkhouser, B. Chazelle, D. Dobkin, Shape Distributions, ACM, TOG, 21 (4), pp. 807-832, 2002. and this document is herein cited by reference) Coordinates of the points to be generated are determined by the following expression 1 by using coordinates ABC of the vertices of each triangle and pseudorandom numbers r1, r2:

[Expression 1]

$$(1-\sqrt{r_1})A + \sqrt{r_1}(1-r_2)B + \sqrt{r_1}r_2 C \quad (1)$$

In the present embodiment, Mersenne Twister random number generator was used as a pseudorandom number generator. It is herein assumed that M point groups are generated in total. In the embodiment, M was set to $2^{15}$, i.e., M=32,768. The centroid of the three-dimensional model is obtained by the point groups thus generated. The problem of the arbitrariness of the position is solved by translating the centroid $m_I$ to the origin. In the embodiment, a point group data matrix is represented by the following expression:

$$m_I = \frac{1}{32768}\sum_{i=1}^{32768} p_i \quad \text{[Expression 2]}$$

-continued $$P = \begin{pmatrix} p_{x_1} - m_{I_x} & p_{x_2} - m_{I_x} & \cdots & p_{x_n} - m_{I_x} \\ p_{y_1} - m_{I_y} & p_{y_2} - m_{I_y} & \cdots & p_{y_n} - m_{I_y} \\ p_{z_1} - m_{I_z} & p_{z_2} - m_{I_z} & \cdots & p_{z_n} - m_{I_z} \end{pmatrix}$$

The point group matrix P is then subjected to singular value decomposition to obtain a rotating matrix R.

$$P = UD\Sigma^T$$

$$R = U^T \quad \text{[Expression 3]}$$

Figure 2:
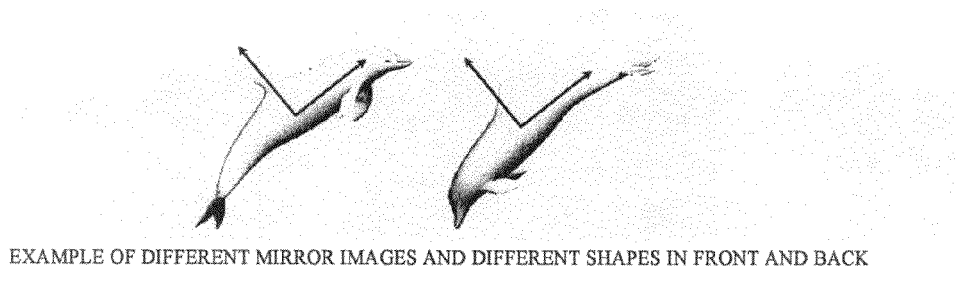
FIG. 2 is a diagram showing an example in which mirror images in Points SVD are different.

Finally, a mirror image of the three-dimensional model is determined. Even with the same axis, feature vectors vary if mirror images are different (see FIG. 2).

The point groups are rotated by the rotating matrix R.

$$P' = RP \quad \text{[Expression 4]}$$

In the case of the embodiment having M=32,768, the mirror image matrix F of the model is computed as follows:

$$f_x = \sum_{i=0}^{32768} \text{sign}(p'_{x_i})|p'_{x_i}|^2 \quad (f_y, f_z \text{ similar}) \quad \text{[Expression 5]}$$

$$F = \begin{pmatrix} \text{sign}(f_x) & 0 & 0 \\ 0 & \text{sign}(f_y) & 0 \\ 0 & 0 & \text{sign}(f_z) \end{pmatrix}$$

By using the center of gravity $m_I$, the rotating matrix R, and the mirror image matrix F obtained by the above expression, model vertices V are translated and rotated to complete the pose normalization as summarized in V'.

$$V = \begin{pmatrix} v_{x_1} - m_{I_x} & v_{x_2} - m_{I_x} & \cdots & v_{x_n} - m_{I_x} \\ v_{y_1} - m_{I_y} & v_{y_2} - m_{I_y} & \cdots & v_{y_n} - m_{I_y} \\ v_{z_1} - m_{I_z} & v_{z_2} - m_{I_z} & \cdots & v_{z_n} - m_{I_z} \end{pmatrix} \quad \text{[Expression 6]}$$

$$V' = FRV$$

A pose normalization method similar to Points SVD is proposed by Ohbuchi et al. (R. Ohbuchi, T. Otagiri, M. Ibato, T. Takei, Shape-Similarity Search of Three-Dimensional Models using Parameterized Statistics. Proc. Pacific Graphics 2002, pp. 265-274. 2002. This document is cited herein by reference). This method is different from Points SVD in that Sobol random numbers as quasi-random numbers are used to generate point groups and the distance from the center is used to resolve the mirror image.

Hereinafter, normal SVD will be described in detail.

Figure 3:
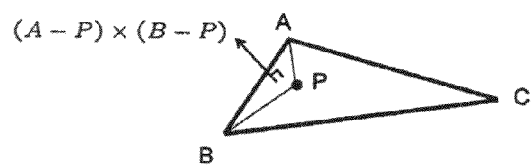
FIG. 3 is a diagram showing computation principles in normal SVD.

A basic calculation method is the same as that of Points SVD. In the normal SVD, point groups are generated by using a normal vector determined from each generated point and the closest two vertices of a corresponding triangle as a mass point (FIG. 3).

First, a mean value of normal vectors n is obtained. In the embodiment of M=32,768, the mean normal vector is obtained as follows:

$$m_N = \frac{1}{32768}\sum_{i=1}^{32768} n_i \quad \text{[Expression 7]}$$

A normal vector matrix N is then subjected to singular value decomposition to obtain a rotating matrix R.

$$V = \begin{pmatrix} v_{x_1} - m_{N_x} & n_{x_2} - m_{N_x} & \cdots & n_{x_n} - m_{N_x} \\ n_{y_1} - m_{N_y} & n_{y_2} - m_{N_y} & \cdots & n_{y_n} - m_{N_y} \\ n_{z_1} - m_{N_z} & n_{z_2} - m_{N_z} & \cdots & n_{z_n} - m_{N_z} \end{pmatrix} \quad \text{[Expression 8]}$$

$$N = UD\Sigma^T$$

$$R = U^T$$

Finally, a mirror-image determining matrix F is computed in the same manner as that of Points SVD, based on the rotated point groups.

$$V' = FRV \quad \text{[Expression 9]}$$

Pose normalization is thus completed, as summarized in V'. Definition of a vertex matrix V is the same as that of Points SVD.

Each model thus obtained is aligned by a Bounding Sphere method.

The Bounding Sphere method is a method in which a three-dimensional model as a search target, which has been subjected to pose normalization, is aligned so as to be surrounded a unit sphere having a radius of 1. Specifically, with the Bounding Sphere method, coordinates of each vertex of the three-dimensional model are divided by the largest value of the distances between the center of the three-dimensional model and all the vertices thereof.

The feature vector computing unit 40 includes a Depth Buffer feature vector computing section 41, a silhouette image feature vector computing section 42, a contour image feature vector computing section 43, a voxel feature value computing section 44, a similarity computing section 45, and a composite section 47.

A two-dimensional image creating subsection 411 of the Depth Buffer feature vector computing section 41 reads the data of the three-dimensional model stored in the Points SVD data storage section 15 and the Normal SVD data storage section 17 and creates two-dimensional images (Depth Buffer images) to be used to compute a Depth Buffer feature vector. A Depth Buffer image is a two-dimensional image representing the distance (depth) from an arbitrary viewpoint to the surface of a three-dimensional model.

Figure 4:
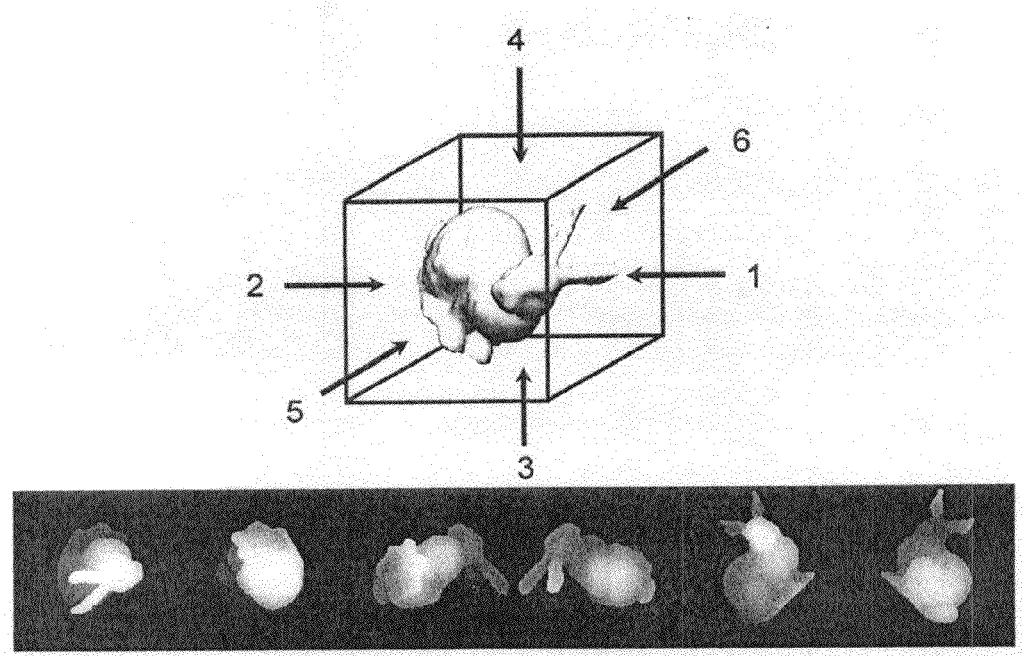
FIG. 4 is a diagram showing an example of Depth Buffer images.

In the embodiment, Depth Buffer images having 256×256 pixels are formed by viewing a three-dimensional model from six orthogonal directions (see FIG. 4).

The z values (depths) of each Depth Buffer image are integers of, taking a range [0, 255]. The z values decrease as the distances between the viewpoint and arbitrary points on the three-dimensional model increase. The background is 0.

A compensation subsection 413 compensates the Depth Buffer images by embedding information of the distance from the center in the Depth Buffer images. More specifically, provided that I(x, y) is the intensity of each pixel of the Depth Buffer images and r is the distance from the center of each Depth Buffer image, the intensity I'(x, y) of each coordinates of the compensated images is represented as follows in the case of the embodiment of the 256×256 pixel size:

$$r = \sqrt{(128-x)^2 + (128-y)^2}$$

$$I'(x,y) = rI(x,y)^2 \quad \text{[Expression 10]}$$

The compensated images are sometimes called periphery enhanced images (PEIs).

Figure 5:
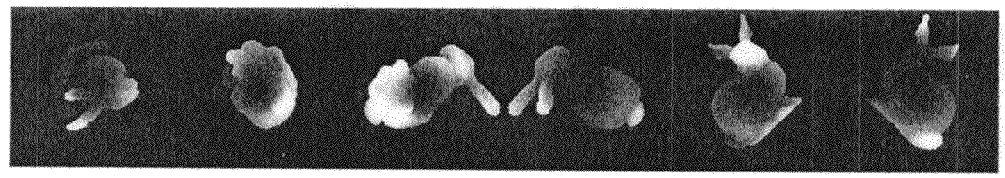
FIG. 5 is a diagram showing an example of Depth Buffer images compensated by periphery enhanced image filtering (PEI image).

The compensated images are shown in FIG. 5.

It can be seen from FIG. 5 and Expression 9 that the gray scales of the compensated two-dimensional images are emphasized more as the distance from the center of the image increases. It can also be seen that the pixels become darker as the distance from the center of the image decreases.

Figure 6:
FIG. 6 shows images obtained by transforming the Depth Buffer images compensated by the peripheral enhanced image filtering to polar coordinates

Finally, the compensated Depth Buffer images are transformed from rectangular coordinates to polar coordinates. The images transformed to the polar coordinates are shown in FIG. 6. In the polar coordinate system, the abscissa indicates r, and the ordinate indicates a rotation angle θ. The image size is 128×512 in the present embodiment.

A Fourier transform subsection 415 then performs a Fourier transform on these images to obtain Fourier coefficients $g_{\rho\phi}$.

$$g_{\rho\phi} = \sum_r \sum_\theta I'(r, \theta) e^{-j2\pi(r\rho/R + \theta\phi/T)} \quad \text{[Expression 11]}$$

In this expression, ρ indicates a spatial frequency of the abscissa, φ indicates a spatial frequency of the ordinate, and $0 \leq \rho < 128$ and $0 \leq \phi < 512$. The value of a Fourier coefficient is a power spectrum. Rotation in the rectangular coordinate system corresponds to translation in the polar coordinate system, and a power spectrum obtained by Fourier transform has a translation-invariant property. If there is an error in pose normalization, arbitrariness of orientation can be slightly relaxed.

Only low-frequency components are extracted from the power spectra of the six images and used as a Depth Buffer feature $f_{Depth\,Buffer}$.

$$m_{DepthBuffer} = (|g_{0,0}^{(1)}|, |g_{0,1}^{(1)}|, \ldots, |g_{0,32}^{(1)}|, \ldots, |g_{8,0}^{(1)}|, \ldots, |g_{8,32}^{(1)}|, \ldots, |g_{8,32}^{(6)}|)$$

$$f_{DepthBuffer} = m_{DepthBuffer}/|m_{DepthBuffer}| \quad \text{[Expression 12]}$$

Only the low-frequency components are used as a feature vector in order to ignore high-frequency components as noises in the similarity search.

Figure 7:
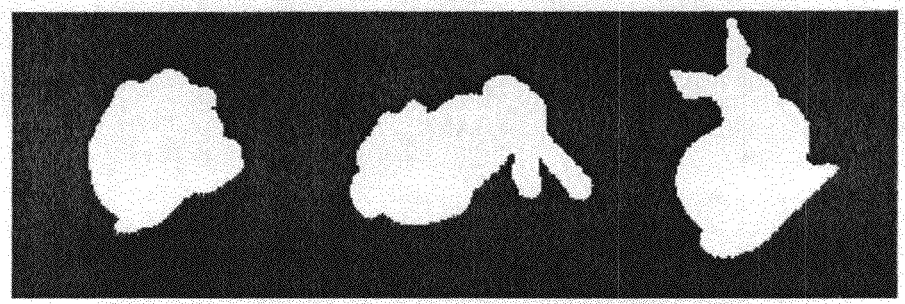
FIG. 7 is a diagram showing an example of silhouette images.

A two-dimensional image creating subsection 421 of the silhouette image feature vector computing section 42 reads the data of the three-dimensional model stored in the Points SVD data storage section 15 and the Normal SVD data storage section 17 and creates two-dimensional images (silhouette images) to be used to compute a silhouette image feature vector. A silhouette image is a two-dimensional binary image representing the shade formed by applying light to a three-dimensional model. The background is represented by 0 and the shadowed are represented by an integer of 255 (FIG. 7). In the present embodiment, silhouette images are generated by viewing the three-dimensional model from three orthogonal directions.

A compensating subsection 423 then compensates the silhouette images in the same manner as that of the correcting subsection 413 of the Depth Buffer feature vector computing section 41, and thereby produces periphery enhanced images. In this process, the binary silhouette images are compensated to multilevel gray-scale images. The multilevel silhouette periphery enhanced images thus obtained are then transformed to polar coordinates.

A Fourier transform subsection 425 then performs a Fourier transform of these images, and extracts low-frequency components of power spectra of the resultant three images computed from three different viewpoints as a final silhouette image feature vector $f_{Silhouette}$.

$$m_{Silhouette} = (|g_{0,0}^{(1)}|, |g_{0,1}^{(1)}|, \ldots, |g_{0,32}^{(1)}|, \ldots, |g_{8,0}^{(1)}|, \ldots, |g_{8,32}^{(1)}|, \ldots, |g_{8,32}^{(3)}|)$$

$$f_{Silhouette} = m_{Silhouette}/|m_{Silhouette}| \quad \text{[Expression 13]}$$

Figure 8:
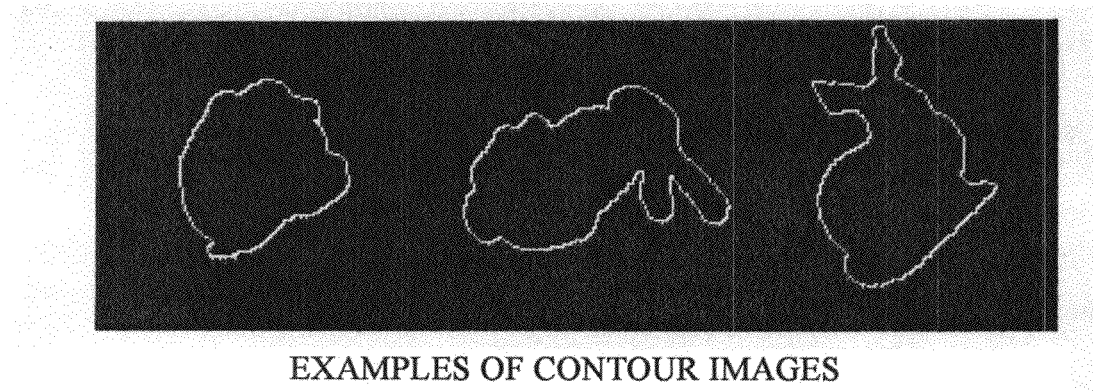
FIG. 8 is a diagram showing an example of contour images.

A two-dimensional image creating subsection 431 of the contour image feature vector computing section 43 reads the data of the three-dimensional model stored in the Points SVD data storage section 15 and the Normal SVD data storage section 17 and creates two-dimensional images (contour images) to be used to compute a contour image feature vector. A contour image is a two-dimensional binary image representing the contour of the shadow formed by applying lighting computation to a three-dimensional model (FIG. 8). The background is represented by 0 and the contour part is represented by an integer of value 255, which is the maximum brightness of the 8-bit integer.

The contour images are directly transformed to polar coordinates without compensation.

A Fourier transform subsection 435 then performs a Fourier transform of the contour images, and extracts low-frequency components of power spectra of the resultant three images, viewing from three different directions, as a contour image feature vector $f_{Contour}$.

$$m_{Contour} = (|g_{0,0}^{(1)}|, |g_{0,1}^{(1)}|, \ldots, |g_{0,32}^{(1)}|, \ldots, |g_{8,0}^{(1)}|, \ldots, |g_{8,32}^{(1)}|, \ldots, |g_{8,32}^{(3)}|)$$

$$f_{Contour} = m_{Contour}/|m_{Contour}| \quad \text{[Expression 14]}$$

The voxel feature vector computing unit 44 will now be described.

Figure 9:
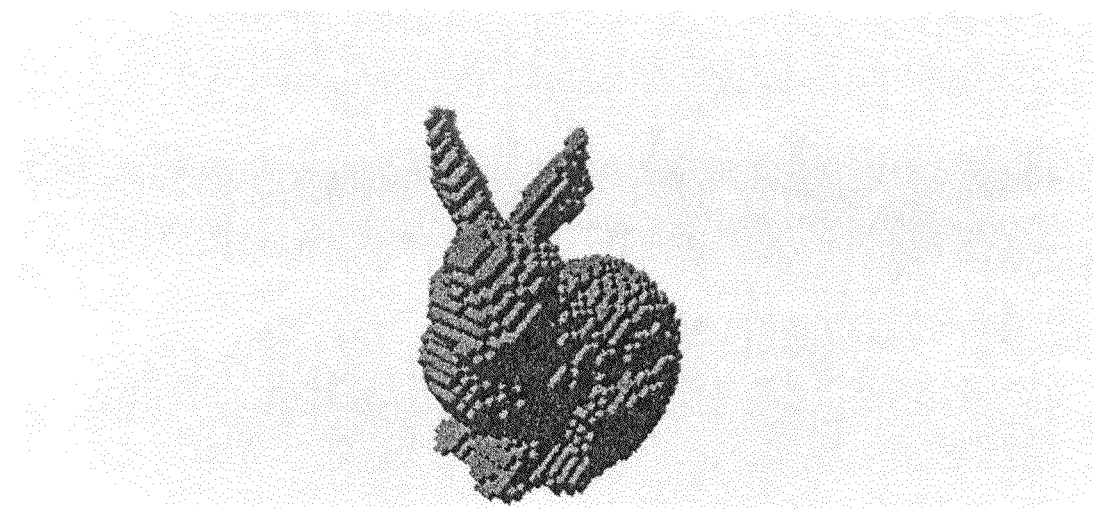
FIG. 9 is a diagram showing an example of a voxel.

A voxel is a collection of small unit cubes which represents the shape of a three-dimensional model. A three-dimensional model is placed in a grid space, and grids crossing a plane are represented by 1 and other grids are represented by 0 (FIG. 9).

A two-dimensional image creating subsection 441 reads the data of the three-dimensional model stored in the Points SVD data storage section 15 and the Normal SVD data storage section 17 and, in the embodiment, transforms the read data to a 64×64×64 voxel.

The two-dimensional image creating subsection 441 then a 3×3×3 three-dimensional Gaussian filter is applied to the generated voxel. This Gaussian filter can enhance curve information of an object. Each voxel grid thus obtained by the Gaussian filter has a value of [0, 255].

A Fourier transform subsection 445 performs a three-dimensional Fourier transform on the voxel grid to obtain a power spectrum.

$$g_{p,q,s} = \sum_x \sum_y \sum_z \text{Voxel}(x, y, z) e^{-j2\pi\left(\frac{xp}{J} + \frac{yq}{K} + \frac{zs}{L}\right)} \quad \text{[Expression 15]}$$

Note that, in the embodiment, the following parameters are set: $0 \leq p < J = 64$, $0 \leq q < K = 64$, and $0 \leq s < L = 64$ in Expression 15, where p, q and s stand for indices of the voxel grid corresponding to x, y, and z-axis, respectively.

The Fourier transform subsection 445 then extracts only low-frequency components of the power spectrum as a voxel feature vector $f_{Voxel}$.

$$m_{Voxel} = (|g_{0,0,0}|, |g_{0,0,1}|, \ldots, |g_{0,0,8}|, \ldots, |g_{0,8,0}|, \ldots, |g_{8,0,0}|, \ldots, |g_{8,8,8}|)$$

$$f_{Voxel} = m_{Voxel}/|m_{Voxel}| \quad \text{[Expression 16]}$$

Since the Depth Buffer feature vector, the silhouette image feature vector, the contour image feature vector, and the voxel feature vector are all representing spectra, these feature vectors can be concatenated as one-dimensional vectors, and Manhattan distances are respectively computed in Manhattan distance computing subsections 417, 427, 437, and 447.

$$L_1(FV_a, FV_b) = \sum_i |FV_a(i) - FV_b(i)| \quad \text{[Expression 17]}$$

In this process, the distance to a feature vector $FV_{Points}$ of the three-dimensional model read from the Points SVD data storage section 15 and the distance to a feature vector $FV_{Normal}$ of the three-dimensional model read from the Normal SVD data storage section 17 are compared, and the smaller one of the distances is used.

$$\text{Distance}(FV_{Query}, FV_{Database}) = \quad \text{[Expression 18]}$$
$$\min\{L_1(FV_{Points}^{Query}, FV_{points}^{Database}), L_1(FV_{Normal}^{Query}, FV_{Normal}^{Database})\}$$

A weight computing section 45 computes a weight by considering both the smaller distance described above and all the distances in the database. The weight computation is performed by using an algorithm of Ohbuchi et al. (R. Ohbuchi, Y. Hata, Combining Multiresolution Shape Descriptors for 3D model Retrieval, Proc. WSCG 2006, Plzen, Czech Republic, Jan. 30-Feb. 2, 2006. This document is cited herein by reference.) This algorithm starts with normalizing the distance d of each feature vector. Provided that µ(di) is a mean value and σ(di) is a standard deviation, the normalization is performed as shown by Expression 19:

$$\hat{d}_i(q, o) = \frac{1}{2}\left(\frac{d_i(q, o) - \mu(d_i)}{3 \cdot \sigma(d_i)} + 1\right) \quad \text{[Expression 19]}$$

Note that computation of a Purity value is performed under the assumption that the models in the database have been classified into M classes Ck ($0 < k \leq M$). The Purity value is the largest number Sk of models matching with the models in the class Ck in the first t models Rt of the search result.

$$S_i^k = R_i^t \cap Q_i$$

$$\text{purity}(FV_{i,q,t}) = \max_{1 \leq k \leq M}(|S_i^k|) \quad \text{[Expression 20]}$$

The Purity value to the power of n is a weight (w).

The composite section 47 multiplies each distance by the weight thus obtained and obtains the sum of the products. Note that the Purity value need not necessarily be used, but is used as one of weight computation methods.

$$D(FV_{Query}, FV_{Database}) = w_{DepthBuffer} D_{DepthBuffer} + w_{Silhouette} D_{Silhouette} + w_{Contour} D_{Contour} + w_{Voxel} D_{Voxel} \quad \text{[Expression 21]}$$

The feature vectors are composited by using the resultant distance as a final distance. Hereafter, the search method using the above expression is called Multi-Fourier Spectra Descriptor, or MFSD for short.

The feature vector comparing unit 50 compares the final distance obtained in the composite section 47 with the distances stored in the database 13 and displays the comparison result on a display in the order from close to far.

The search system of the embodiment was evaluated as follows:

First Tier (1-Tier), Second Tier (2-Tier), Nearest Neighbor (1-NN), a recall ratio (Recall), and a precision ratio (Precision) are used as scales for evaluating the search system. In order to evaluate each scale, it is necessary to classify the three-dimensional model database into multiple classes in advance. Classes are determined manually by subjectively dividing the models into multiple sets of models according to similarity in system. PSB (Princeton Shape Benchmark) data set used in the evaluation experiment has been used internationally as an experimental database. In the PSB, 907 three-dimensional models have been classified into 92 classes. Provided that c denotes the number of three-dimensional models of a class to which a search query belongs, k denotes the number of three-dimensional models which are returned as models in the upper positions of the search result, and rel(n) denotes a function that returns the number of relevant three-dimensional models in the top n ranked models of the search result which belong to the same class as that of the search query, the above evaluation scales are defined as follows:

$$\text{First Tier} = \frac{rel(c)}{c} \times 100 \quad \text{[Expression 22]}$$

$$\text{Second Tier} = \frac{rel(2c)}{c} \times 100$$

$$\text{Nearest Neighbor} = rel(1) \times 100$$

$$\text{Recall} = \frac{rel(k)}{c}$$

$$\text{Precision} = \frac{rel(k)}{k}.$$

It should be noted that the three-dimensional model of the search query per se (itself) is excluded in First Tier, Second Tier, and Nearest Neighbor. The higher the seconds results of the First Tier, the Second Tier, and the Nearest Neighbor are, the better the search performance of the system is. Regarding the Recall-Precision graph, the closer the curve is to the upper right corner, the better the search performance of the system is. The First Tier, the Second Tier, and the Nearest Neighbor are described in detail in the study conducted by Osada et al. (R. Osada, T. Funkhouser, B. Chazlelle, D. Dobkin, Shade Distributions, ACM, TOG, 21 (4), pp. 807-832, 2002. This document is cited herein by reference.). The recall and precision are described in detail in the study conducted by Min (P. Min, A 3D Model Search Engine, Ph.D. Thesis, Princeton University, 2004. This document is cited herein by reference).

An experiment of comparison between the search method (MFSD) of the embodiment and the search methods of the conventional examples described before will now be described.

In the search method MFSD of the embodiment, 32,768 point groups were generated for any model during Points SVD and Normal SVD, and the weight used in dissimilarity calculation was a Purity value cubed, where the Purity value was calculated by using the first four models in the search result. These parameters, including the number of point groups and the weight, were optimal values thorough a plurality of experiments performed beforehand. Comparison was also performed by fixing the weight to 1.

Published programs were used for comparing MFSD against the above-mentioned methods: D2, SHD, LFD, and DSR 472.

Figure 10:
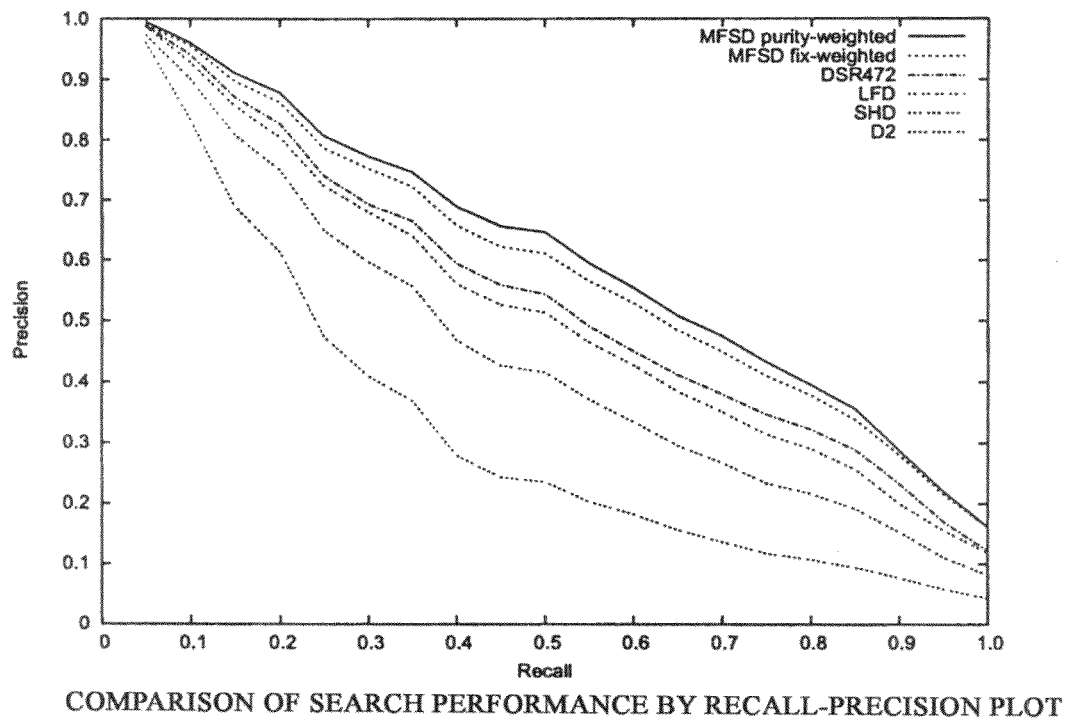
FIG. 10 is a graph showing comparison of search performance between the search method of the embodiment and search methods of conventional examples.
Figure 11:
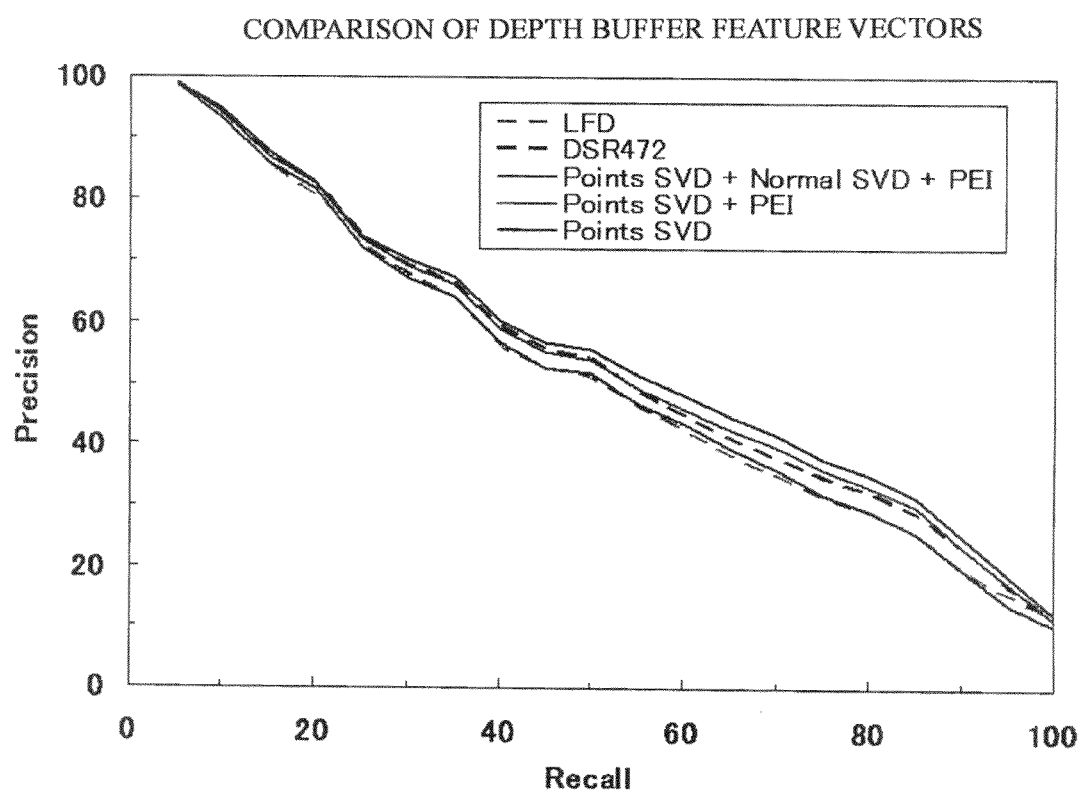
FIG. 11 is a graph showing comparison of search performance between the search method of the embodiment and the search methods of the conventional examples.

FIG. 10 shows the experimental result of the comparison between the above-mentioned methods four and the search method MFSD of the embodiment. In "MFSD purity-weighted" of the embodiment, the Purity method was used in weight calculation. The weight was fixed to 1 in "MFSD fix-weighted" of the embodiment.

It can be seen from the figure that MFSD purity-weighted outperforms the previous methods in every Recall-Precision combination. A mean precision of LFD is 0.51 and a mean precision of DSR 472 is 0.53, while the mean precision of MFSD purity-weighted is 0.60. The mean precision of MFSD fix-weighted is 0.58. This result shows that MFSD has search performance superior to that of the previous four methods even under the condition that the weight is fixed to 1.

Table 1 shows search performance of each method in terms of the evaluation criteria 1-Tier, 2-Tier, and 1-NN, where 1-NN denotes the Nearest Neighbor.

TABLE 1

SEARCH PERFORMANCE COMPARISON IN TERMS OF EVALUATION CRITERIA 1-TIER, 2-TIER, AND 1-NN

| SEARCH METHOD | 1-Tier | 2-Tier | 1-NN |
|---|---|---|---|
| MFSD purity-weighted | 47.2% | 60.2% | 74.6% |
| MFSD fix-weighted | 45.2% | 59.0% | 71.4% |
| DSR472 | 40.4% | 52.2% | 65.8% |
| LFD | 37.8% | 49.2% | 65.9% |
| SHD | 31.0% | 42.0% | 55.3% |
| D2 | 18.7% | 27.9% | 35.7% |

MFSD purity-weighed is higher than DSR472 by 6.8% and 8.0% in 1-Tier and 2-Tier, respectively. MFSD purity-weighted is also higher than LFD by 8.5% in 1-NN. MFSD fix-weighted is also higher than the other feature values in 1-Tier, 2-Tier, and 1-NN.

In the spectral clustering of this embodiment, the number of clusters k and the number of neighboring models m are the two parameters which determine the clustering accuracy.

In order to obtain the optimal set of parameters for performing the spectral clustering on a PSB (Princeton Shape Benchmark) data set, the percentage of search accuracy was computed while varying these parameters, i.e., the number of dimensions k and the number of neighboring models m. 1-Tier (see Expression 22) was herein used as an evaluation scale. Table 2 summarizes the result of this experiment.

TABLE 2

| NUMBER OF DIMENSIONS k (NUMBER OF CLUSTERS) | NUMBER OF NEIGHBORING MODELS m | | | | |
|---|---|---|---|---|---|
| | 91 | 272 | 454 | 635 | 816 |
| 9 | 39.8% | 43.4% | 47.3% | 49.8% | 45.4% |
| 27 | 45.9% | 49.3% | 55.8% | 58.7% | 49.8% |
| 45 | 45.4% | 50.7% | 59.5% | 62.2% | 49.0% |
| 63 | 45.0% | 49.5% | 60.9% | 60.4% | 47.5% |
| 82 | 44.9% | 48.0% | 57.2% | 60.6% | 47.2% |

The number of dimensions (the number of clusters) k was given from 1/100, 3/100, . . . of the total number of models and the number of neighboring models m was varied to 1/10, 3/10, . . . of total number of models where the actual total number of models was 907. The experimental result demonstrates that there are optimal values near the number of dimensions (the number of clusters) k=45 and the number of neighboring models m=635. The experiment was therefore performed by more finely varying the values k and m. In this experiment, the best 1-Tire accuracy was 64.5% when the number of dimensions (the number of clusters) k=40 and the number of neighboring models m=615. This result shows that it is desirable to set the number of neighboring models m to a larger value.

The spectral clustering thus modified is herein referred to as MSC (Modified Spectral Clustering). FIG. 14 shows the experimental result of comparison among the following three methods applied to a PSB (Princeton Shape Benchmark) data set: the search method (MFSD) described in the above embodiment; a plain spectral clustering method (SC); and the modified spectral clustering (MSC) in which SC is performed after MFSD. It turns out that plain SC has search performance inferior to that of MFSD, but MSC in which MFSD and SC are combined has significantly improved search performance.

The result of applying the search method MFSD (weight: fixed to 1) of the embodiment to databases other than the PSB (Princeton Shape Benchmark) data set will now be described.

Figure 16:
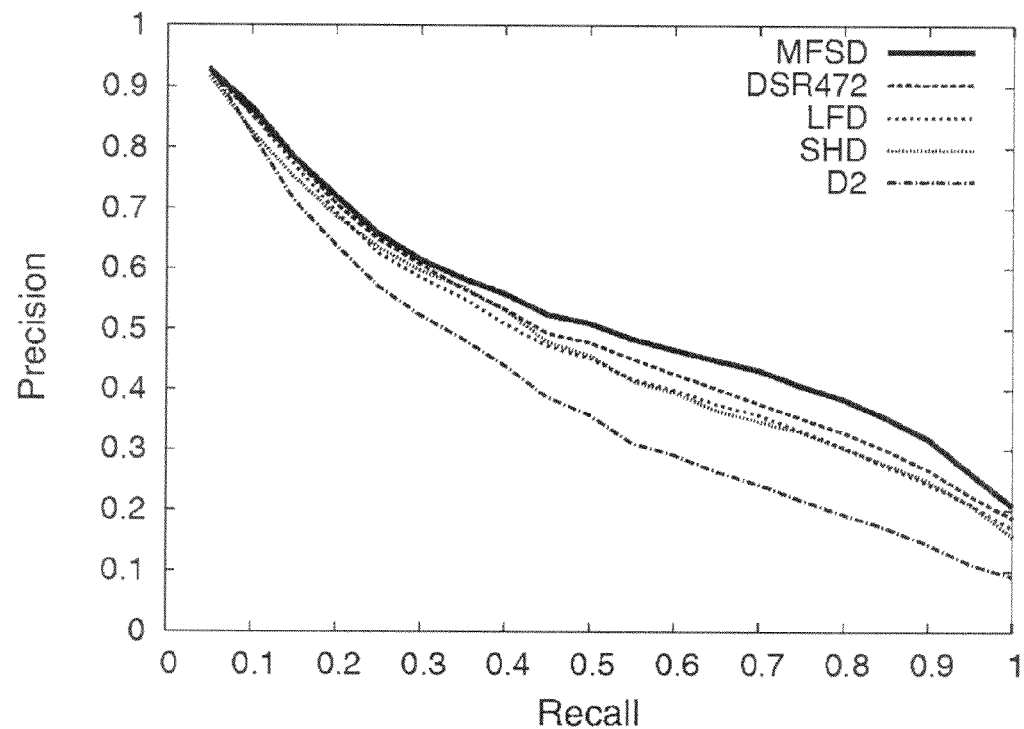
FIG. 16 is a graph showing comparison of search performance between the search method of the embodiment and the search methods of the conventional examples when ESB was used as a database.

Table 3 and FIG. 16 show the search performance obtained by applying several methods to PSB (Princeton Shape Benchmark).

TABLE 3

| METHOD | 1-Tier | 2-Tier | 1-NN |
|---|---|---|---|
| MFSD | 45.2% | 58.9% | 71.9% |
| DSR472 | 40.4% | 52.2% | 65.8% |
| LFD | 37.8% | 49.2% | 65.9% |
| SHD | 31.0% | 42.0% | 55.3% |
| D2 | 18.7% | 27.9% | 35.7% |

Figure 15:
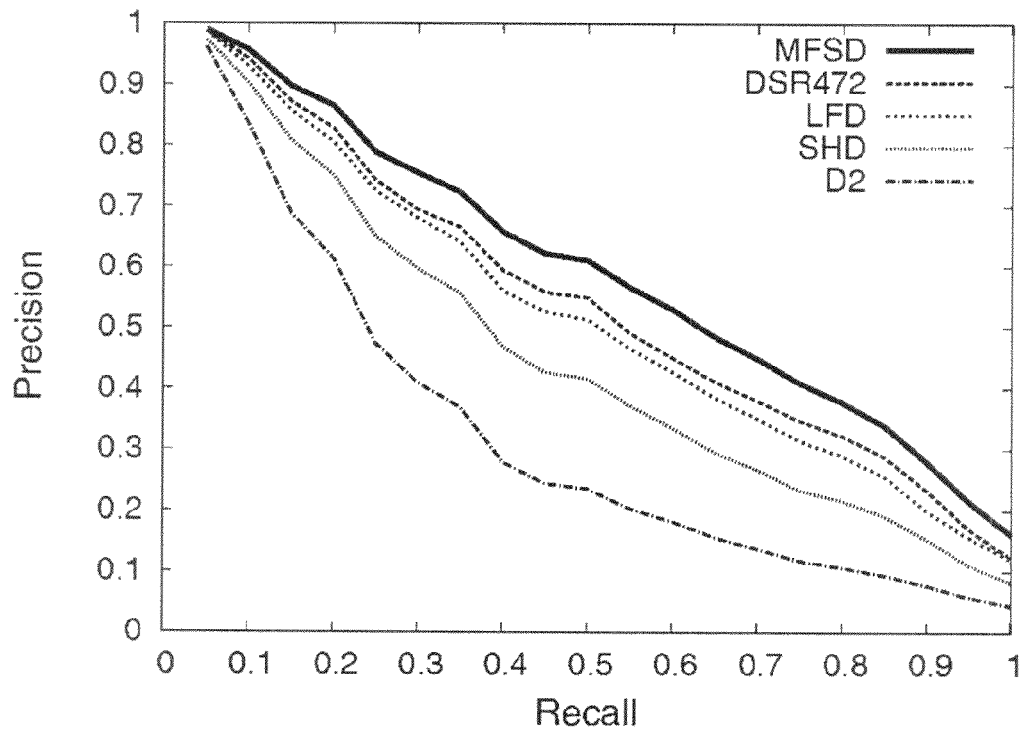
FIG. 15 is a graph showing comparison of search performance between the search method of the embodiment and the search methods of the conventional examples when PSB was used as a database.

Similarly, Table 4 and FIG. 15 show the search performance obtained by applying several methods to ESB (Engineering Shape Benchmark).

TABLE 4

| METHOD | 1-Tier | 2-Tier | 1-NN |
|---|---|---|---|
| MFSD | 44.9% | 61.3% | 83.6% |
| DSR472 | 41.4% | 55.6% | 82.4% |
| LFD | 39.8% | 54.1% | 82.0% |
| SHD | 40.0% | 54.3% | 80.7% |
| D2 | 31.7% | 44.1% | 75.5% |

Figure 17:
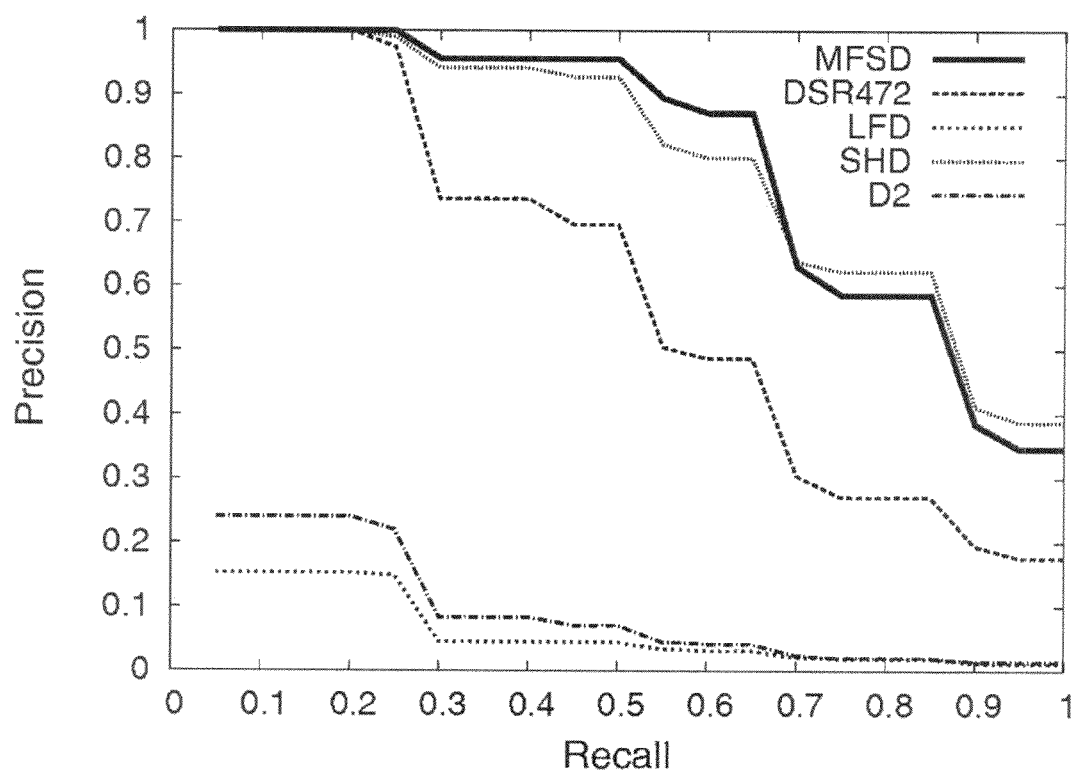
FIG. 17 is a graph showing comparison of search performance between the search method of the embodiment and the search methods of the conventional examples when SHREC 2007 was used as a database.

Similarly, Table 5 and FIG. 17 show the search performance obtained by applying several methods to SHREC 2007 (Shape Retrieval Contest 2007).

TABLE 5

| METHOD | 1-Tier | 2-Tier | 1-NN |
|---|---|---|---|
| MFSD | 68.5% | 79.7% | 100.0% |
| DSR472 | 49.1% | 56.4% | 100.0% |
| LFD | 4.2% | 7.6% | 7.6% |
| SHD | 65.4% | 81.8% | 100.0% |
| D2 | 9.4% | 14.2% | 9.4% |

Figure 18:
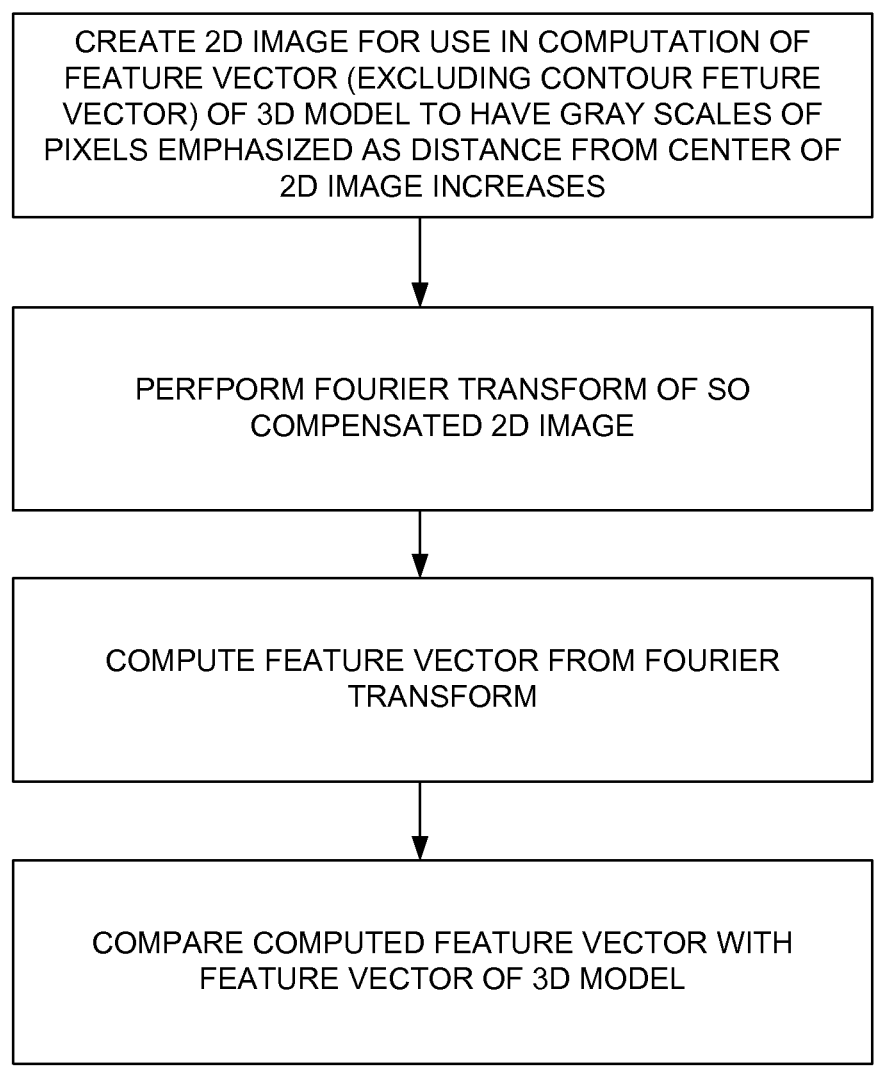
FIG. 18 is a flow-chart schematically illustrating an embodiment of the search method of the invention.

These results demonstrate that the search method of the embodiment has a significant effect on all these databases. A flow-chart schematically illustrating an embodiment of the search method of the invention is presented in FIG. 18.

The present invention is not limited to the description of the embodiment and the examples given above. The present invention is capable of various modifications within a range readily apparent to those skilled in the art without departing from the scope of the invention as set forth in the appended claims.

The invention claimed is:

1. A three-dimensional model search method for retrieving a known three-dimensional model similar to a three-dimensional model as a search query which has been subjected to pose normalization, comprising the steps of:

compensating a two-dimensional image for use in computation of a feature vector (excluding a contour feature vector) of said three-dimensional model as said search query so that gray scales of pixels are emphasized as the distance from a center of said two-dimensional image increases;

performing a Fourier transform of said compensated two-dimensional image;

computing a feature vector from the result of said Fourier transform; and comparing said obtained feature vector with a feature vector of said known three-dimensional model.

2. A three-dimensional model search method according to claim 1, wherein said two-dimensional image is a Depth Buffer image or a silhouette image, and provided that r is a distance from said center of said two-dimensional image, an intensity I'(x, y) of each coordinate in said compensated two-dimensional image is represented by the following expression in said compensating step:

$$r=((Kx-x)^2+(Ky-y)^2)^{1/2}$$

$$I'(x,y)=r*I(x,y)^2$$

where, Kx, Ky are center coordinates of said two-dimensional image before compensation in an x-axis direction and a y-axis direction, respectively, and I (x, y) represents an intensity of each coordinate in said two-dimensional image before compensation.

3. A three-dimensional model search method according to claim 2, wherein a Fourier transform is performed on each of the first compensated two-dimensional image obtained by compensating said Depth Buffer image by the method of claim 2, the second compensated two-dimensional image obtained by compensating said silhouette image by the method of claim 2, the third two-dimensional image for use in computation of a contour feature vector, and a voxel grid for use in computation of a voxel feature vector, feature vectors are computed based on the respective results of said Fourier transforms, and said feature vectors thus obtained are composited.

4. A three-dimensional model search method, further comprising the step of performing a plurality of pose normalization processes on a three-dimensional model and followed by performing the method according to claim 1 on the three-dimensional model subjected to the plurality of pose normalization processes.

5. A three-dimensional model search method according to claim 4, wherein said pose normalization processes include the first pose normalization method for generating random points on triangles forming said three-dimensional model, performing principal component analysis by using said random points as mass points, thereby obtaining a principal axis, and performing normalization; and the second pose normalization method for obtaining a principal axis based on the distribution of normal vectors obtained by each random point generated on a plane of said three-dimensional model and two vertices of a triangle close to said random point, and performing normalization.

6. A three-dimensional model search method according to claim 1, wherein a database of said known three-dimensional model is partitioned into clusters in advance by spectral clustering.

7. A tangible non-transitory computer-readable storage medium containing a computer program for causing a computer to perform the method according to claim 1.

8. A three-dimensional model search system for retrieving a known three-dimensional model similar to a three-dimensional model as a search query which has been subjected to pose normalization, comprising:

means for compensating a two-dimensional image for use in computation of a feature vector (excluding a contour feature vector) of said three-dimensional model as said search query so that gray scales of pixels are emphasized as the distance from a center of said two-dimensional image increases;

means for performing a Fourier transform of said compensated two-dimensional image;
means for computing a feature vector from the result of said Fourier transform; and
means for comparing said obtained feature vector with a feature vector of said known three-dimensional model.

* * * * *

UNITED STATES PATENT AND TRADEMARK OFFICE
CERTIFICATE OF CORRECTION

PATENT NO.        : 8,494,310 B2
APPLICATION NO.   : 12/514144
DATED             : July 23, 2013
INVENTOR(S)       : Aono et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this
Eighth Day of September, 2015

Michelle K. Lee
*Director of the United States Patent and Trademark Office*